United States Patent
Dhanuka et al.

(12) 
(10) Patent No.: US 12,073,499 B2
(45) Date of Patent: Aug. 27, 2024

(54) GLYPH EDIT WITH ADORNMENT OBJECT

(71) Applicant: Adobe Inc., San Jose, CA (US)

(72) Inventors: Praveen Kumar Dhanuka, Howrah (IN); Shivi Pal, Noida (IN); Arushi Jain, Ashok Vihar (IN)

(73) Assignee: Adobe Inc., San Jose, CA (US)

( * ) Notice: Subject to any disclaimer, the term of this patent is extended or adjusted under 35 U.S.C. 154(b) by 63 days.

(21) Appl. No.: 17/985,431

(22) Filed: Nov. 11, 2022

(65) Prior Publication Data

US 2024/0161361 A1     May 16, 2024

(51) Int. Cl.
    *G06T 11/60*     (2006.01)
    *G06T 3/40*      (2024.01)
    *G06T 11/20*     (2006.01)

(52) U.S. Cl.
    CPC ............... *G06T 11/60* (2013.01); *G06T 3/40* (2013.01); *G06T 11/203* (2013.01); *G06T 2200/24* (2013.01)

(58) Field of Classification Search
    CPC ......... G06T 11/60; G06T 3/40; G06T 11/203; G06T 2200/24
    See application file for complete search history.

(56) References Cited

U.S. PATENT DOCUMENTS

| | | | |
|---|---|---|---|
| 10,319,129 B2 | 6/2019 | Dhanuka et al. | |
| 11,244,486 B2 | 2/2022 | Agrawal et al. | |
| 11,755,817 B2 | 9/2023 | Dhanuka et al. | |
| 2011/0007970 A1 | 1/2011 | Saund | |
| 2013/0093794 A1 | 4/2013 | Dairman et al. | |
| 2014/0115452 A1* | 4/2014 | Rudolph | G06F 40/109 715/256 |
| 2019/0317980 A1 | 10/2019 | Dhanuka et al. | |
| 2020/0026501 A1 | 1/2020 | Baldwin et al. | |
| 2023/0035439 A1 | 2/2023 | Dhanuka | |

OTHER PUBLICATIONS

Sarah ("How to make Name Flowers on Cricut Design Space", Apr. 21, 2022, https://www.youtube.com/watch?v=CX0CU2FE2VU&t=1298s) (Year: 2022).*
Crystal ("How to add tails to font in Design Space", Nov. 15, 2019, https://www.youtube.com/watch?v=_hmCgl45lVs) (Year: 2019).*
U.S. Appl. No. 17/391,536, "Notice of Allowance", U.S. Appl. No. 17/391,536, filed Jul. 21, 2023, 5 pages.
Dhanuka, Praveen Kumar, et al., "US Application as Filed", U.S. Appl. No. 18/361,824, filed Jul. 29, 2023, 46 pages.
U.S. Appl. No. 17/391,536, "Non-Final Office Action", U.S. Appl. No. 17/391,536, filed Apr. 19, 2023, 12 pages.

(Continued)

*Primary Examiner* — Xin Sheng
(74) *Attorney, Agent, or Firm* — FIG. 1 Patents

(57) ABSTRACT

Glyph editing techniques through use of an adornment object are described. In one example, an input is received identifying a glyph and an adornment object in digital content displayed in a user interface. Glyph anchor points are obtained based on the glyph and adornment anchor points based on the adornment object. A link is generated between at least one said glyph anchor point and at least one said adornment anchor point. An edit input is received specifying an edit to a spatial property the glyph. The spatial property of the edit is propagated to a spatial property of the adornment object based on the link.

20 Claims, 8 Drawing Sheets

(56) References Cited

OTHER PUBLICATIONS

Bentley, J.L., et al., "Algorithms for Reporting and Counting Geometric Intersections", IEEE Transactions on Computers, vol. C-28, No. 9 [retrieved Jun. 15, 2023]. Retrieved from the Internet <http://www.itseng.org/research/papers/topics/VLSI_Physical_Design_Automation/Physical_Verification/DRC/Geometric_Intersection_Problems/1979-Bentley.pdf>., Sep. 1979, 5 Pages.

"Anchored objects", Adobe, Inc. [retrieved Nov. 1, 2022]. Retrieved from the Internet <https://helpx.adobe.com/in/indesign/using/anchored-objects.html>., Apr. 12, 2022, 16 Pages.

U.S. Appl. No. 17/391,536, "Non-Final Office Action", U.S. Appl. No. 17/391,536, filed Dec. 14, 2022, 12 pages.

Dhanuka, Praveen Kumar, et al., "US Application as Filed", U.S. Appl. No. 17/391,536, filed Aug. 2, 2021, 73 pages.

* cited by examiner

GLYPH EDIT WITH ADORNMENT OBJECT

BACKGROUND

Fonts and glyphs that represent individual elements of the fonts (e.g., letters, numbers, symbols) are used to convey a wide range of artistic ideas in digital content, examples of which include webpages, digital images, logos, and so forth. This is also usable to implement a variety of typographic operations as a part of "live text" in which the text is modifiable to make changes as to which glyphs are included in text, size of the glyphs, arrangement of the glyphs, and so on. In some instances, however, additional changes desired by creative professionals to the glyphs are destructive and as such limit a further ability to use typographic operations to edit text using these glyphs, e.g., to resize characters, change arrangements, reformatting, spacing, and even which glyphs are included as described above.

SUMMARY

Glyph editing techniques through use of an adornment object are described. In one example, an adornment module of a text management system receives an input specifying a glyph and an adornment object in digital content, e.g., displayed in a user interface. The adornment module obtains glyph anchor points based on the glyph and adornment anchor points based on the adornment object. The adornment module then selects at least one of the glyph anchor points to be linked to a corresponding adornment anchor point. The link is stored as part of metadata of the digital content.

An edit input is then received involving a spatial property of the glyph, e.g., involving movement or scale of the glyphs. Changes to the spatial property of the glyph cause a corresponding change to the glyph anchor points of the glyph through use of the link. Therefore, the adornment module uses the link to propagate the edit to the adornment object through corresponding changes in the adornment anchor points.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
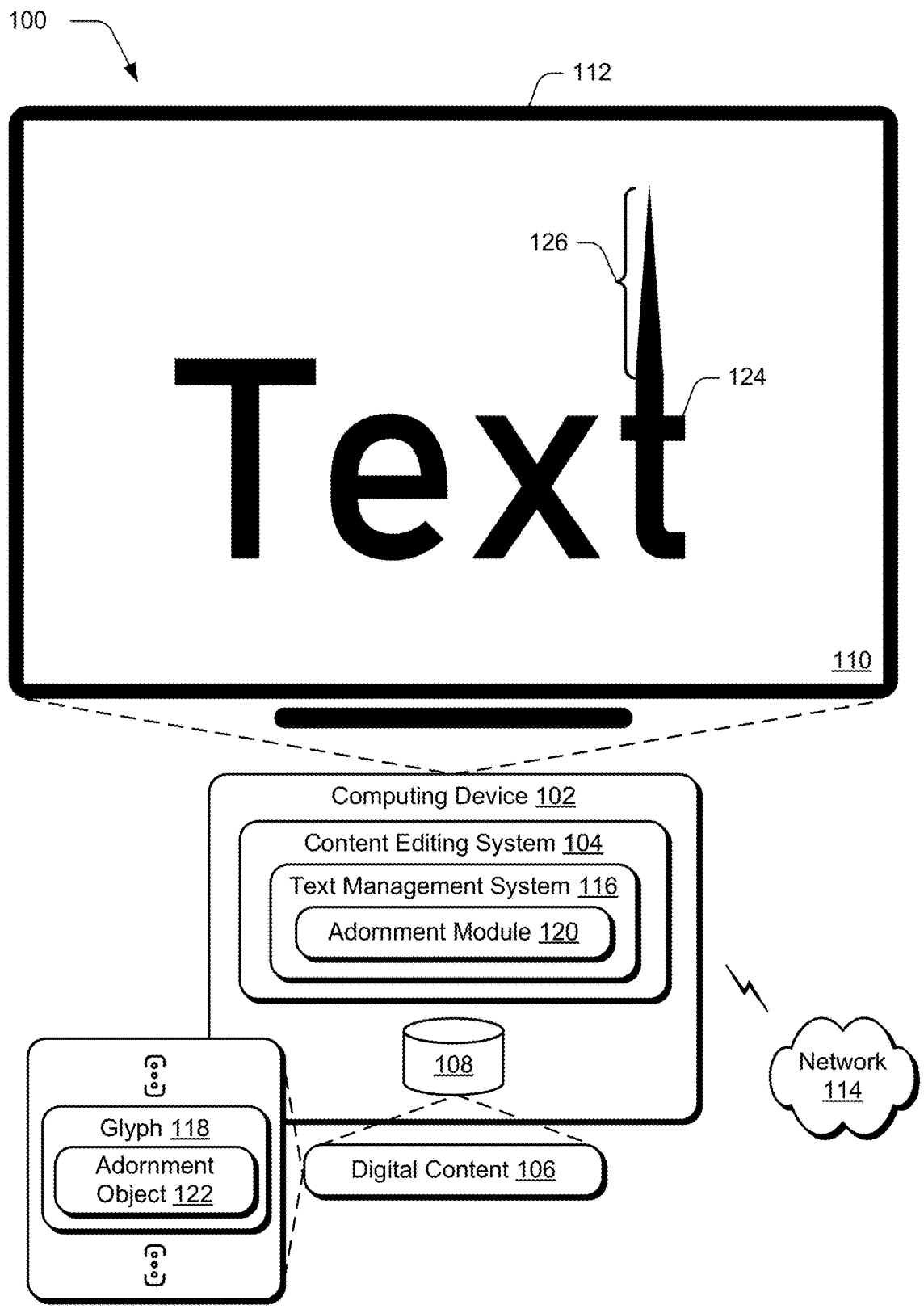
FIG. 1 is an illustration of an environment in an example implementation that is operable to employ glyph edit with adornment object techniques described herein.

Glyphs are usable to convey a wide variety of visual information and artistic expression by defining how characters, numbers, symbols, and so forth are represented as part of digital content. However, conventional techniques used to make changes to individual glyphs are destructive and as such remove a further capacity of a content editing system to edit the text using typographic operations, e.g., to change characters, spacing, sizing, leading, baseline, and so forth. This hinders a user's ability to further modify the glyphs and text that includes the glyphs, limits rendering functionality, and as such hinders operation of computing devices that implement these conventional techniques.

In a conventional technique, for instance, a desired glyph is converted into an outline and then an adornment object is manually placed in proximity to that glyph. In this conventional approach, however, conversion into an outline causes a loss of support for typographic operations because text properties are no longer editable. Additionally, this technique is inflexible and thus is challenged in instances in which the same adornment object is to be manually attached to other glyphs through a repeated process as part of creating inline graphics.

Accordingly, glyph editing techniques through use of an adornment object are described that overcome these technical challenges by preserving glyphs as live text. In this way, the glyphs support continued use of typographic operations even though visual changes are made to the glyphs through addition of the adornment object. This supports increased visual accuracy and avoids visual artifacts otherwise caused by resizing, change in baselines, and other edits in conventional techniques.

In one example, an adornment module of a text management system receives an input specifying a glyph and an adornment object in digital content, e.g., displayed in a user interface. The input, for instance, is provided as part of movement of the adornment object and/or the glyph in the user interface as part of a gesture, use of a cursor control device, selection of a menu item to initiate a corresponding operation, and so forth.

The adornment module obtains glyph anchor points based on the glyph and adornment anchor points based on the adornment object. The adornment module then selects at least one of the glyph anchor points to be linked to a corresponding adornment anchor point. In a first instance, this is performable based on proximity, e.g., by determining which glyph anchor points are disposed within a threshold distance of the adornment anchor points, which anchor points of the adornment object are disposed on an outline of the glyph, and so forth. In a second instance, this is performed manually responsive to receipt of a user input via the user interface that specifies the link as a mapping between the points. Resizing, translation, rotation, and other operations are also usable as part of this linking to edit one or both of the glyph or adornment object, e.g., such that a width of the adornment object approximates a width of a corresponding portion of the glyph.

The link is stored as part of metadata of the digital content. The link, for instance, specifies a relative index of the glyph anchor points with corresponding adornment anchor points and includes a unique identifier which is stored as part of stylesheet data of the digital content. As a result, the glyph remains configured as "live text" and as such continues to support typographic operations, even with the addition of the adornment object. Further, the link supports an ability to adjust the adornment object based on edits made to the glyph (and vice versa) through a propagation technique.

An edit input, for instance, is received involving a spatial property of the glyph, e.g., involving movement or scale of the glyph. The edit input is usable to add or remove other glyphs to a line of text that includes the glyph. This is also performable using typographic operations, examples of which include changes to leading, baseline, and so forth. A change to the spatial property of the glyph causes a corresponding change to the glyph anchor points of the glyph. Therefore, use of the link by the adornment module is employed to propagate the edit to the adornment object through corresponding changes in the adornment anchor points. As a result, the edit to the glyph is also made automatically and without user intervention to the adornment object.

This is also usable to support a variety of other functionality, examples of which include automatic attachment based on glyph geometry and anchor detection, filtering a glyph of interest based on proximity of shape, flexible nondestructive attachment and reattachment, user intent drive creative outputs, and is adaptable to text editability. As such, these techniques over conventional challenges involving edits to glyphs that are inefficient and hinder operation of computing devices, and result in visual artifacts resulting from changes that are no longer supported by typographic operations using the glyphs. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ glyph edit with adornment object techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 8.

The computing device 102 is illustrated as including a content editing system 104. The content editing system 104 is implemented in hardware of the computing device 102 (e.g., a processing device and computer-readable storage medium) to process and transform digital content 106, which is illustrated as maintained in a storage device 108 of the computing device 102. Examples of digital content 106 include digital documents, digital images, digital media, and so forth. Examples of processing include creation of the digital content 106, modification of the digital content 106, and rendering of the digital content 106 in a user interface 110 for output, e.g., by a display device 112. Although illustrated as implemented locally at the computing device 102, functionality of the digital content editing system 104 is also configurable as whole or part via functionality available via the network 114, such as part of a web service or "in the cloud."

An example of functionality incorporated by the content editing system 104 to process the digital content 106 is illustrated as a text management system 116, e.g., through use of scripts, fonts, and glyphs. Scripts correspond to collections of letters, numbers, and symbols, e.g., Latin, Greek, and so on. Accordingly, scripts include a multitude of fonts. Fonts specify a set of the letters, numbers, and symbols of the script in a particular style and size. Glyphs 118 are elemental symbols with respective fonts corresponding to individual instances of the letters, numbers, and symbols in the particular style and size for the font. The glyphs 118 are identifiable using a respective Unicode identifier (ID), i.e., Unicode value. In this way, scripts, fonts included in the scripts, and glyphs included as part of the fonts are usable to provide a multitude of different visual representations of elemental symbols.

The adornment module 120 is representative of functionality to further edit the glyphs 118 through use of an adornment object 122. The adornment object 122 is configurable as an ornament, enhancement, and/or embellishment to the glyph 118. The adornment object 122 also supports implementation in a variety of ways, examples of which include a raster object formed using pixels, a vector object that is mathematically defined, and so forth. In the illustrated example, a glyph 124 "t" is included as part of a collection of glyphs forming a word "text" in a text line in the user interface 110. An adornment object 126 is added to the top of the glyph 124 to extend its visual appearance upward.

As previously described, conventional techniques that are used for glyph modification are destructive and therefore "break" further text editability of the glyph. This causes the glyph to no longer support typographic operations. Once the adornment object is added to an outline of the glyph "t" in conventional implementations, the glyph is no longer modifiable as part of the remaining text, e.g., to add glyphs, remove glyphs, change size, and so forth.

The adornment module 120, however, addresses these challenges by preserving text editability of the glyph 118, even though an adornment object 122 has been added. To do so, anchor points of the adornment object 122 are linked to corresponding anchor points of the glyph, i.e., are mapped one-to-another. This link is storable by the adornment module 120 as part of metadata of the digital content 106, e.g., as part of stylesheet data. The link, as stored, is usable to support edits between the glyph 118 and the adornment object 122.

An edit input, for instance, is received involving a spatial property of the glyph, e.g., involving movement or scale of the glyphs. Changes to the spatial property of the glyph 118 cause a corresponding change to the glyph anchor points of the glyph 118. Therefore, use of the link by the adornment module 120 is usable to propagate the edit from the glyph 118 to the adornment object 122 through corresponding changes in the adornment anchor points. As a result, the edit to the glyph 118 is also made automatically and without user intervention to the adornment object 122. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Glyph Edit with Adornment Object Techniques and Systems

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6 in parallel with an example procedure 700 of FIG. 7.

In the following discussion, an object that is attached to the glyph is referred to as "adornment (A)" and "adornment object 122" and the glyph, with which, the adornment object is to be attached is referred to as "target glyph (G)" and "glyph 118." The adornment module 120 is configured to automatically maintain a link between the glyph 118 and the adornment object 122 that is usable to propagate edits.

Figure 2:
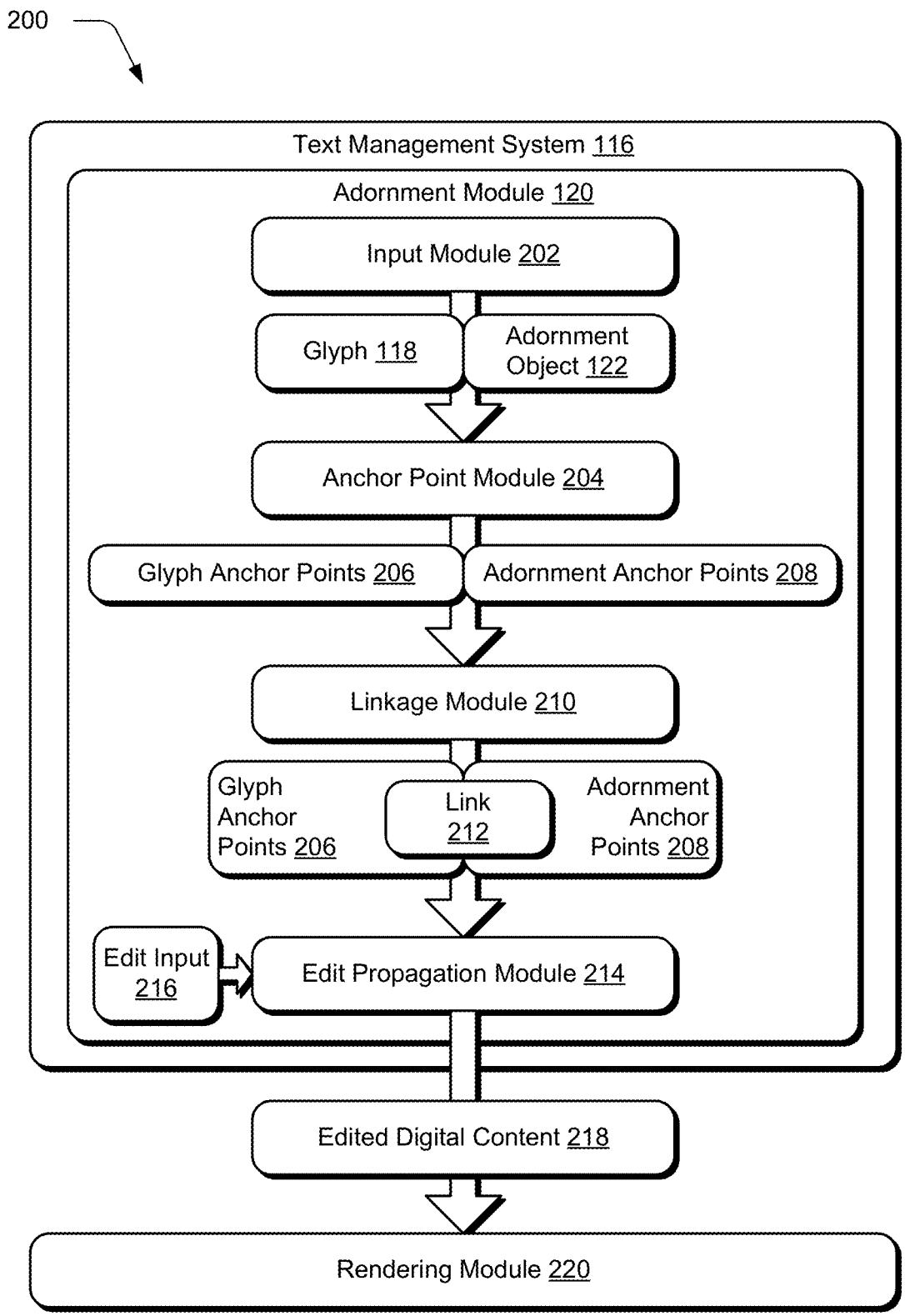
FIG. 2 depicts a system in an example implementation showing operation of an adornment module of FIG. 2 in greater detail as forming edited digital content.

To begin as shown in an example system 200 of FIG. 2, an input is received identifying a glyph and an adornment object in digital content displayed in a user interface (block 702). An input module 202, for instance, is configured to receive this input originated through user interaction with the user interface 110. In a first example, the input involves movement of the glyph 118 and/or the adornment object 122 within a threshold distance of each other. Once within this threshold distance, a snapping operation is performed to connect the glyph 118 with the adornment object 122, e.g., via corresponding anchor points. In a second example, the input manually specifies corresponding anchor points that are to be linked, e.g., through successive selection between the glyph 118 and the adornment object 122. A variety of other examples are also contemplated.

In response, glyph anchor points are obtained based on the glyph and adornment anchor points are obtained based on the adornment object (block 704). In one example, an anchor point module 204 is employed to detect the anchor points based on a mathematical representation of the glyph 118 and adornment object 122, e.g., as vector objects. This results in glyph anchor points 206 generated from the glyph 118 and adornment anchor points 208 generated from the adornment object 122.

Figure 3:
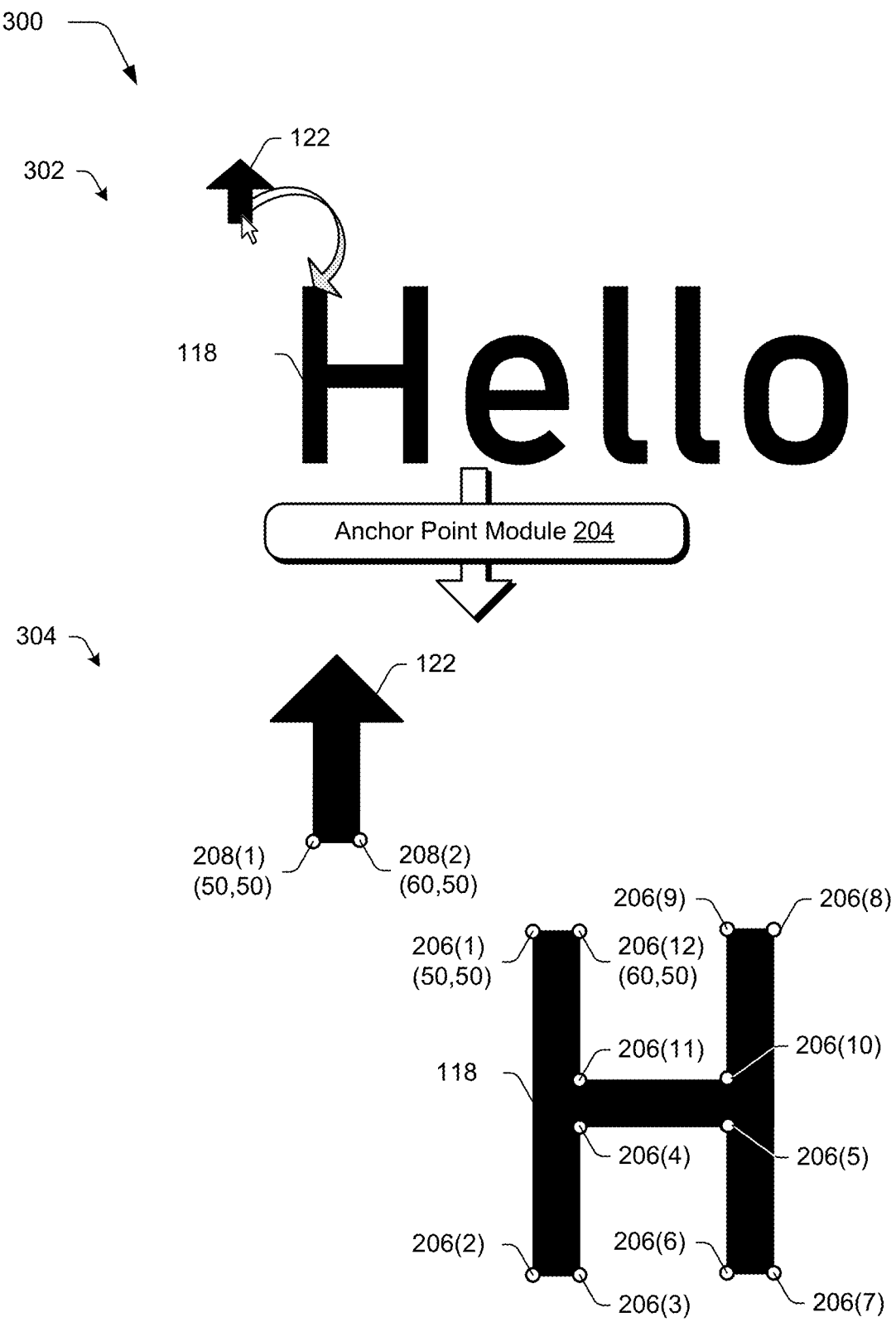
FIG. 3 depicts an example implementation showing operation of an anchor point module of FIG. 2 in greater detail.

FIG. 3 depicts an example system 300 in which an input is received specifying a glyph and adornment object, responsive to which, anchor points are obtained by an anchor point module 204 of FIG. 2. This system is illustrated using a first stage 302 and a second stage 304.

At the first stage 302, an input is received that selects an adornment object 122 and moves the object within a threshold distance of a glyph 118 depicted as a letter "H." In response, the adornment module 120 determines that the adornment object 122 is to be linked to the glyph 118 and initiates the anchor point module 204 to obtain the anchor points.

The glyph 118, for instance, is configurable as a vector object having anchor points that specify a path forming an outline of the glyph 118, which are referred to as glyph anchor points 206. Likewise, adornment anchor points 208 are detected that define the adornment object 122. In the illustrated example depicted at the second stage 304, adornment anchor points 208(1), 208(2) forming part of the adornment object 122 are identified. Additionally, glyph anchor points 206(1), 206(2), 206(3), 206(4), 206(5), 206 (6), 206(7), 206(8), 206(9), 206(10), 206(11), 206(12) are obtained that define the glyph 118 as a capital letter "H." Other examples are also contemplated, such as to form an outline (e.g., as a Bezier curve) to encompass a raster object used to form the adornment object 122, and so forth.

The glyph anchor points 206 and adornment anchor points 208 are then passed from the anchor point module 204 as an input to a linkage module 210. The linkage module 210 is configured to generate a link 212 between at least one glyph anchor point and at least one adornment anchor point (block 706). Continuing with the previous example, after calculating glyph anchor points 206 based on an outline of the glyph 118, a relative index of those anchor points is determined in the outline of the glyph 118, which is defined in FIG. 3 as the ordering of glyph anchor points from glyph anchor points 206(10 successively to glyph anchor points 206(12). By relative, this means that a parametric value "t" of those anchor points defines a successive order in a Bezier spline of the glyph 118 "G."

Figure 4:
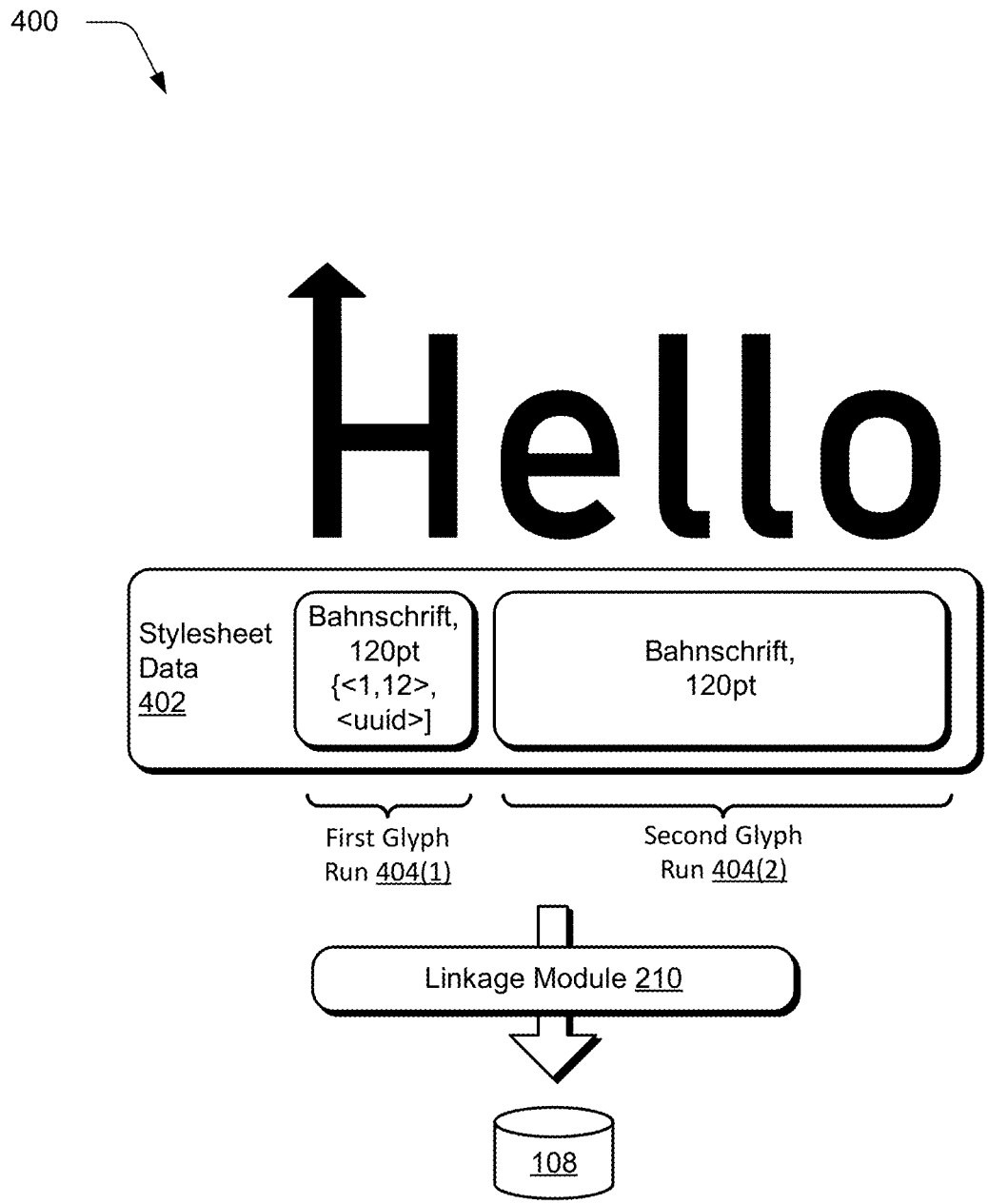
FIG. 4 depicts an example implementation showing link storage as part of stylesheet data of digital content.

Each of those relative indices is stored as part of stylesheet data 402 corresponding to the glyph 118 along with a unique identifier of the adornment object 122 (e.g., "uuid") in metadata of the digital content as shown in an example implementation 400 of FIG. 4. The stylesheet data 402, for instance, includes a first glyph run 404(1) that identifies a font (e.g., "Bahnschrift") and size, e.g., 120 pt. Likewise, the second glyph run 404(2) also identifies a font and size for corresponding glyphs in a word "Hello."

The first glyph run 404(1) also identifies the glyph anchor points 206(1), 206(12) (i.e., "1," and "12") and a corresponding identifier of the adornment object 122. In other words, relative indices of the glyph anchor points 206 of the glyph 118 along with the this identifier of the adornment "A" are stored inside the stylesheet data 402 corresponding to glyph of "G." Resizing, translation, rotation, and other operations are also usable as part of this linking by the linkage module 210 to edit one or both of the glyph or adornment object, e.g., such that a width of the adornment object approximates a width of a corresponding portion of the glyph. These techniques also support the linking of multiple adornment objects to a same glyph, which is manageable through use of an array of adornment object identifiers (e.g., "uuids") and anchor identifiers. The stylesheet data 402 is then stored by the linkage module 210 as part of the digital content 106, e.g., in the storage device 108.

As a result, the glyph 118 remains editable as part of typographic operations, with the link supporting edits that maintain visual consistency between the glyph 118 and the adornment object 122 resulting from edits to either of the objects. An edit propagation module 214, for instance, receives an edit input 216, e.g., specifying an edit to a spatial property of the glyph (block 708). The spatial property of the edit is propagated from the glyph in this example to a spatial property of the adornment object based on the link 212 (block 710). Edited digital content 218 having the edit to the adornment object and the glyph is displayed (block 712) by the display device 112 in the user interface 110 responsive to rendering by a rendering module 220.

Figure 5:
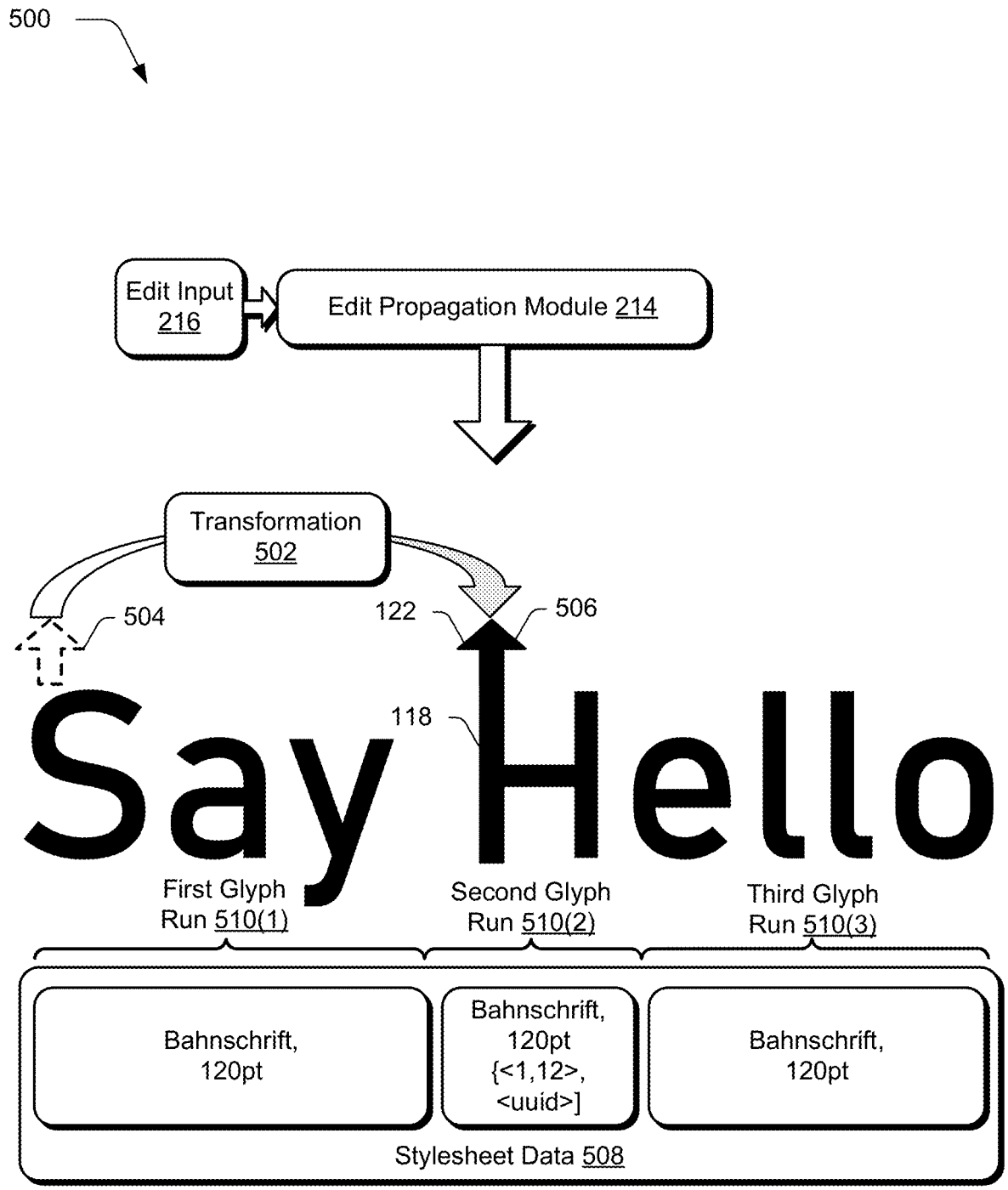
FIG. 5 depicts an example implementation showing operation of an edit propagation module of FIG. 2 in greater detail.

FIG. 5 depicts an example implementation 500 of edit propagation. Use of the link 212 supports propagation of a variety of types of spatial property changes, e.g., from the glyph 118 to the adornment object 122. Examples of these spatial properties include a change to position of scaling of the glyph 118.

Responsive to detecting a change in a spatial property by the edit propagation module 214 of the glyph 118, for instance, a transformation 502 is generated such that the adornment object 122 remains linked with the glyph 118. In the illustrated example, the spatial property involves movement from a first location 504 to a second location 506 defined within the digital content 106 and/or the user interface 110.

To do so, coordinates of the glyph anchor points 206(1), 206(12) at the second location 506 that are specified as part of the link 212 from the glyph 118 to the adornment object 122 are calculated, e.g., using the relative index. The transformation 502 is then calculated for 208(1), 208(2) linked to those glyph anchor points 206(1), 206(12).

In FIG. 5, for instance, additional glyphs spelling a word "Say" are added to a text line that includes the glyph 118 as well as other glyphs. This causes movement of the glyph 118 to the second location 506, with position of glyph anchor points 208(1), 208(12) changed to (110,5) and 120,50), respectively. When compared with coordinates of those anchor points at the first location 504 of (50,50) and (60,50), a transformation 502 involving a translation of sixty units is determined along a horizontal direction.

This transformation 502, when applied to the adornment object 122, causes alignment to be maintained with the glyph 118. These changes are stored as part of the stylesheet data 508 including a first glyph run 510(1), a second glyph run 510(2), and a third glyph run 510(3). The second glyph run 510(2) now includes the linked anchor points and ID of the adornment object 122. A variety of other examples are also contemplated, e.g., to reset a location of the adornment anchor points 208(1), 208(2) directly based on the coordinates of the glyph anchor points 206(1), 206(12) specified in the link. Similar functionality is usable to change scale (e.g., based on movement of the anchor points towards or away from each other), and so forth.

These techniques support a variety of functionalities. In a first example, automatic attachment is supported by the adornment module 120 based on glyph geometry and anchor detection. As an addition to a snap-to-glyph feature, once glyph anchor points 206 are proximal to (e.g., "contact") adornment anchor points 208 of the glyph 118, the adornment module 120 automatically bonds the glyph 118 with the adornment object 122 using the link 212. Filtering is also usable to improve processing efficiency, e.g., as the adornment object 122 is brought closer to the "H" glyph other glyphs are removed from further processing.

This also supports resizing and rotation in addition to movement to align the objects, one with another. The adornment anchor points 208, for instance, are moveable to match repositioning of corresponding glyph anchor points 206 that are changed due to resizing, rotations, and so forth.

Figure 6:
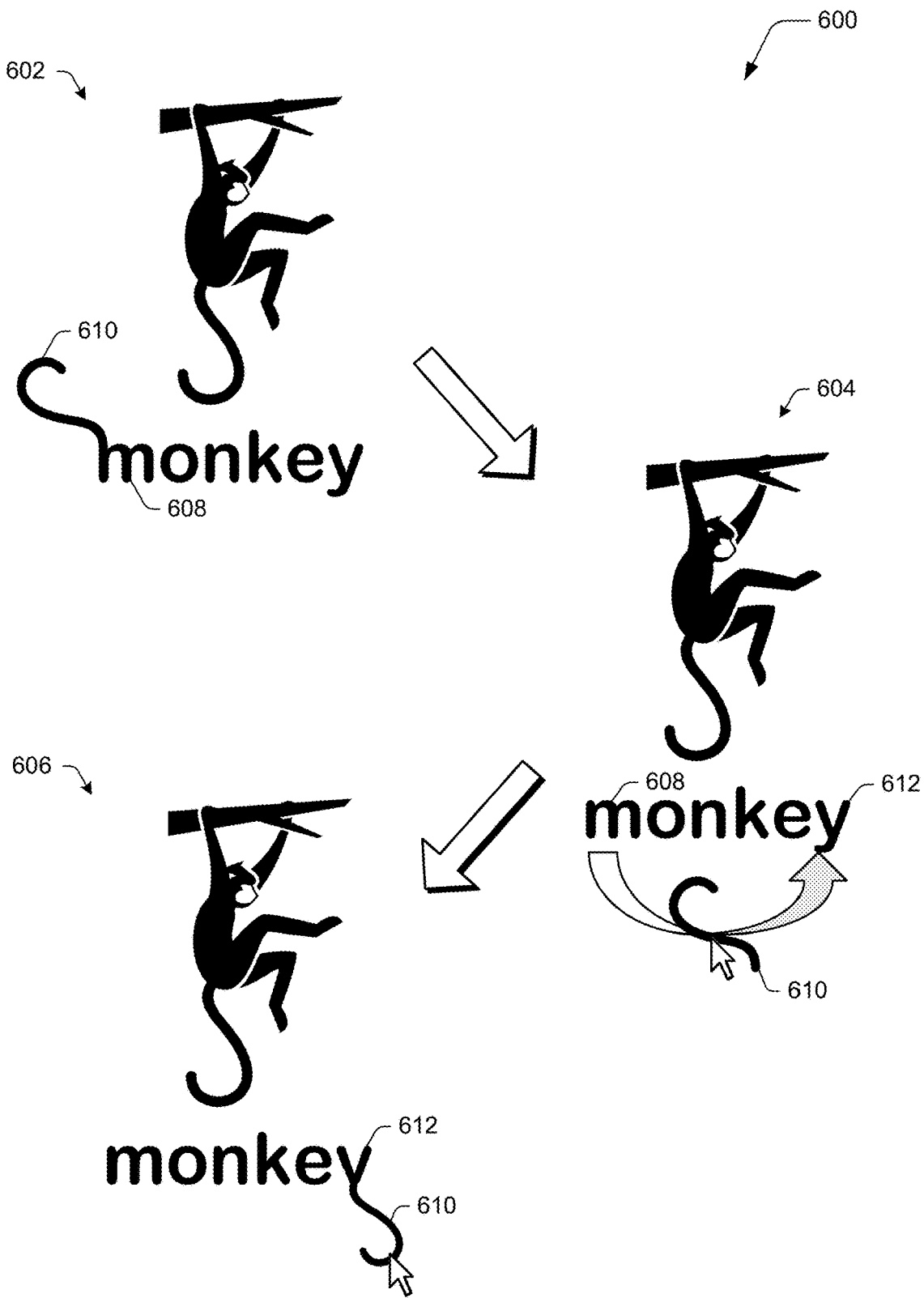
FIG. 6 depicts an example implementation showing non-destruction and flexible attachment of the adornment object as part of a glyph.
Figure 7:
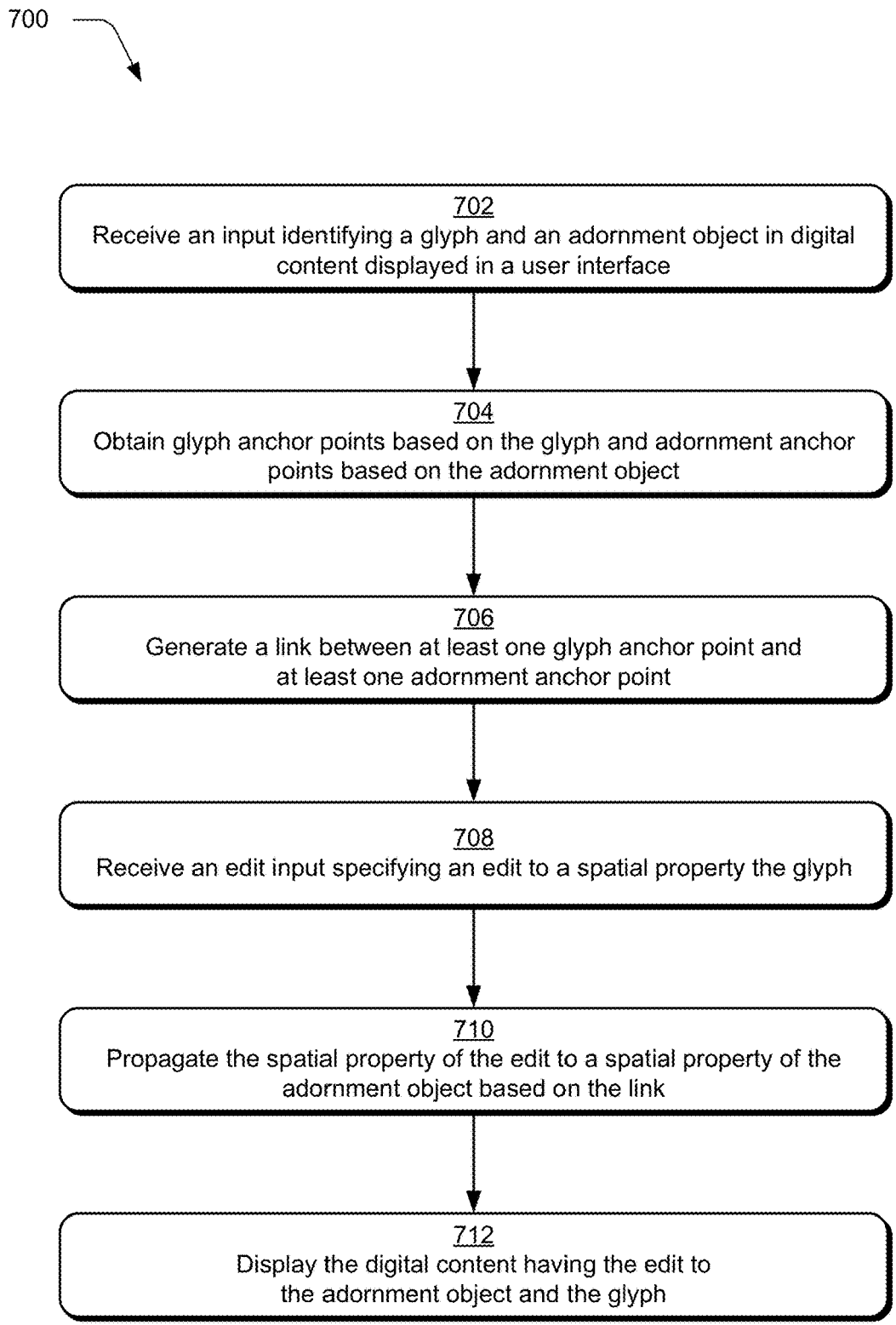
FIG. 7 is a flow diagram depicting a procedure in an example implementation of glyph edit with adornment object techniques.

FIG. 6 depicts an example implementation 600 of nondestructive movement supported by the link techniques described herein. This example implementation 600 is illustrated using a first stage 602, second stage 604, and third stage 606.

At the first stage 602, a glyph 608 of the letter "m" included in a text line spelling "monkey" is linked to an adornment object 610 mimicking a tail of other artwork included in digital content 106. At the second stage 604, an input is received that selects the adornment object 610 for movement from a first location as attached to the glyph 608 of the letter "m" to a glyph 612 of a letter "y" at a second location. This causes the adornment module 120 to link the adornment object 610 to the glyph 612 using the techniques described above.

As a result, the techniques described herein support continued use of typograph operations including addition of removal of other glyphs as shown in FIG. 5, changes in scale, location, nondestructive editing, and so forth.

Example System and Device

Figure 8:
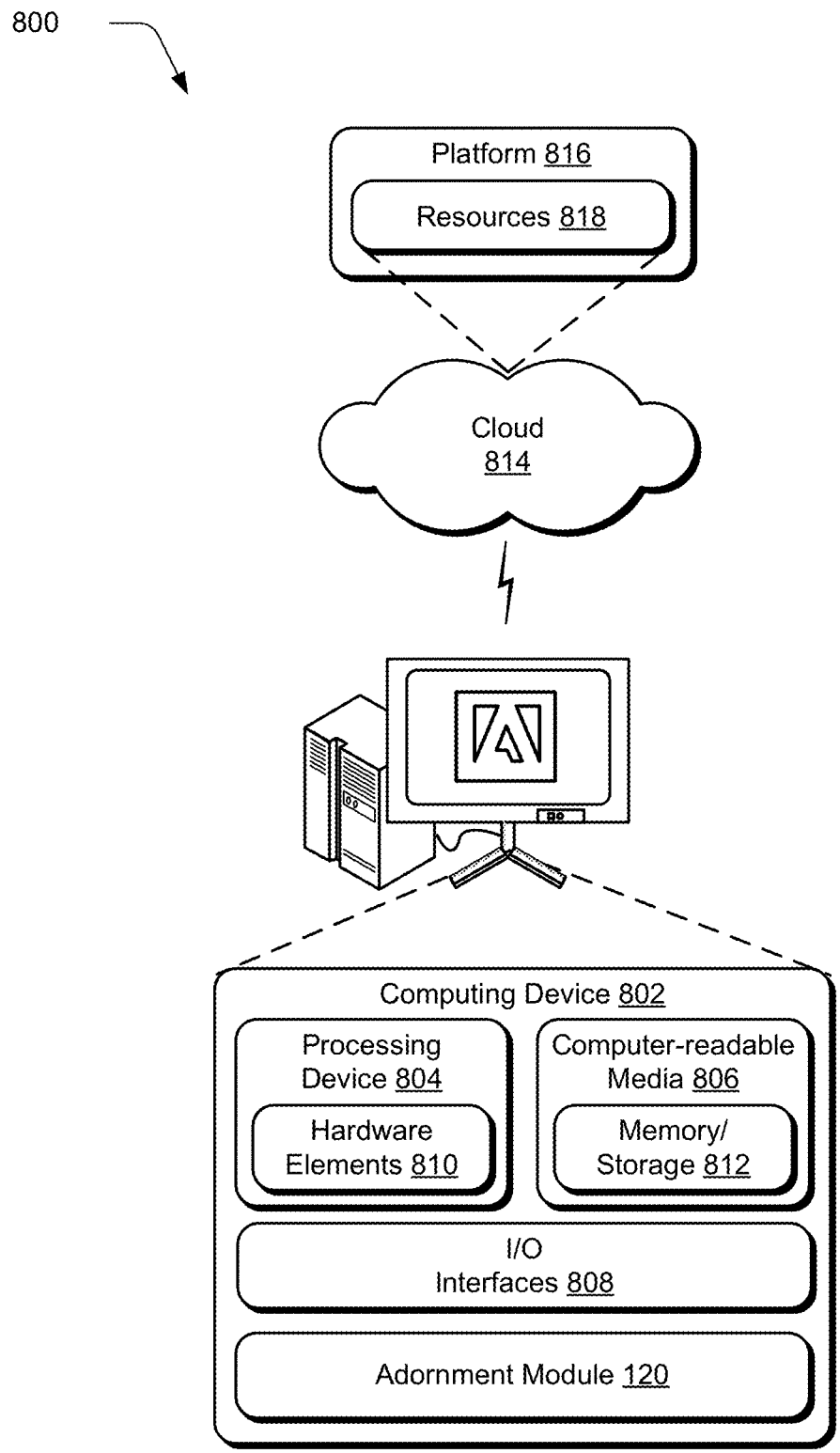
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that implement the various techniques described herein. This is illustrated through inclusion of the adornment module 120. The computing device 802 is configurable, for example, as a server of a service provider, a device associated with a client (e.g., a client device), an on-chip system, and/or any other suitable computing device or computing system.

The example computing device 802 as illustrated includes a processing device 804, one or more computer-readable media 806, and one or more I/O interface 808 that are communicatively coupled, one to another. Although not shown, the computing device 802 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 804 is representative of functionality to perform one or more operations using hardware. Accordingly, the processing device 804 is illustrated as including hardware element 810 that is configurable as processors, functional blocks, and so forth. This includes implementation in hardware as an application specific integrated circuit or other logic device formed using one or more semiconductors. The hardware elements 810 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 806 is illustrated as including memory/storage 812 that stores instructions that are executable to cause the processing device 804 to perform operations. The memory/storage 812 represents memory/storage capacity associated with one or more computer-readable media. The memory/storage 812 includes volatile media (such as random access memory (RAM)) and/or nonvolatile media (such as read only memory (ROM), Flash memory, optical disks, magnetic disks, and so forth). The memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 810. The computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing device 804. The instructions and/or functions are executable/operable by one or more articles of manufacture (for example, one or more computing devices 802 and/or processing devices 804) to implement techniques, modules, and examples described herein.

The techniques described herein are supported by various configurations of the computing device 802 and are not limited to the specific examples of the techniques described herein. This functionality is also implementable all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that can be utilized while computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

In implementations, the platform 816 employs a "machine-learning model" that is configured to implement the techniques described herein. A machine-learning model refers to a computer representation that can be tuned (e.g., trained) based on inputs to approximate unknown functions. In particular, the term machine-learning model can include a model that utilizes algorithms to learn from, and make predictions on, known data by analyzing training data to learn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a processing device, the method comprising:
   receiving, by the processing device, an input identifying a glyph and an adornment object in digital content displayed in a user interface;
   obtaining, by the processing device, glyph anchor points based on the glyph and adornment anchor points based on the adornment object;
   generating, by the processing device, a link between at least one said glyph anchor point and at least one said adornment anchor point by selecting the at least one said glyph anchor point and the at least one said adornment anchor point based on a user input received via the user interface;
   receiving, by the processing device, an edit input specifying an edit to a spatial property the glyph;
   propagating, by the processing device, the spatial property of the edit to a spatial property of the adornment object based on the link; and
   displaying, by the processing device, the digital content having the edit to the adornment object and the glyph.

2. The method as described in claim 1, further comprising storing the link as part of metadata of the digital content.

3. The method as described in claim 2, wherein the metadata is stored as part of stylesheet data corresponding to the glyph in the digital content.

4. The method as described in claim 1, wherein the link identifies the at least one said glyph anchor point as part of a relative index of the glyph anchor points.

5. The method as described in claim 1, wherein the generating includes selecting the at least one said glyph anchor point and the at least one said adornment anchor point based on proximity.

6. The method as described in claim 1, wherein the spatial property is a change in position or a change in scale of the glyph as part of the digital content.

7. The method as described in claim 1, wherein the edit to the glyph is not destructive such that the glyph remains editable as live text through typographic operations performed on the live text after the edit.

8. A system comprising:
   an anchor point module implemented by a processing device to obtain glyph anchor points based on a glyph included in live text of digital content and adornment anchor points based on an adornment object included in the digital content;
   a linkage module implemented by the processing device to generate a link maintained between at least one said glyph anchor point and at least one said adornment anchor point;
   an edit propagation module implemented by the processing device to propagate an edit input specifying an edit to a spatial property the glyph to a spatial property of the adornment object based on the link being maintained such that the glyph remains editable in the live text based on typographic operations performed on the live text after the edit; and
   a rendering module implemented by the processing device to render the digital content having the edit to the adornment object and the glyph for display in a user interface.

9. The system as described in claim 8, wherein the linkage module is configured to store the link as part of metadata of the digital content.

10. The system as described in claim 9, wherein the metadata is stored as part of stylesheet data corresponding to the glyph in the digital content.

11. The system as described in claim 9, wherein the link identifies the at least one said glyph anchor point as part of a relative index of the glyph anchor points.

12. The system as described in claim 8, wherein the linkage module is configured to select the at least one said glyph anchor point and the at least one said adornment anchor point automatically and without user intervention.

13. The system as described in claim 8, wherein the spatial property is a change in position or scale of the glyph as part of the digital content.

14. The system as described in claim 13, wherein the change in position is caused by addition to or removal of another glyph from text of the digital content that also includes the glyph.

15. One or more computer-readable storage media storing instructions that, responsive to execution by a processing device, causes the processing device to perform operations including:
   obtaining stylesheet data of digital content specifying live text including a glyph, an adornment object, and a link maintained between at least one glyph anchor point and at least one adornment anchor point;
   receiving an edit input specifying an edit to a spatial property the glyph;
   propagating the spatial property of the edit to a spatial property of the adornment object based on the link being maintained such that the glyph remains editable in the live text based on typographic operations performed on the live text after the edit; and displaying the digital content having the edit to the adornment object and the glyph.

16. The one or more computer-readable storage media as described in claim 15, wherein the instructions further comprise storing the link as part of metadata of the digital content.

17. The one or more computer-readable storage media as described in claim 16, wherein the metadata is stored as part of stylesheet data corresponding to the glyph in the digital content.

18. The one or more computer-readable storage media as described in claim 15, wherein the spatial property is a change in position or scale of the glyph as part of the digital content.

19. The one or more computer-readable storage media as described in claim 18, wherein the change in position is caused by addition or removal of another glyph from text of the digital content, the digital content including the glyph.

20. The one or more computer-readable storage media as described in claim 15, wherein the typographic operations performed on the live text after the edit include changing characters included in the live text.

* * * * *